United States Patent [19]

Ghisler

[11] Patent Number: 5,703,933
[45] Date of Patent: Dec. 30, 1997

[54] METHOD AND ARRANGEMENT FOR ESTABLISHING A CONNECTION IN A TELECOMMUNICATIONS SYSTEM

[75] Inventor: Walter Ghisler, Upplands Väsby, Sweden

[73] Assignee: Telefonaktiebolaget LM Ericsson (publ.), Stockholm, Sweden

[21] Appl. No.: 646,532

[22] Filed: May 10, 1996

[30] Foreign Application Priority Data

May 31, 1995 [SE] Sweden .................... 9501997

[51] Int. Cl.$^6$ .................................... H04M 11/00
[52] U.S. Cl. .................. 379/58; 379/59; 379/57
[58] Field of Search .................... 379/57, 58, 59, 379/60

[56] References Cited

U.S. PATENT DOCUMENTS

| | | | |
|---|---|---|---|
| 4,658,096 | 4/1987 | West, Jr. et al. | 379/59 |
| 4,737,975 | 4/1988 | Shafer | 379/58 |
| 4,748,655 | 5/1988 | Thrower et al. | 379/60 |
| 4,959,851 | 9/1990 | Tobolski, Jr. et al. | 379/59 |
| 5,117,450 | 5/1992 | Joglekar et al. | 379/58 |
| 5,327,480 | 7/1994 | Breeden | 379/57 |
| 5,448,622 | 9/1995 | Huttunen | 379/58 |
| 5,469,496 | 11/1995 | Emery et al. | 379/58 |
| 5,506,888 | 4/1996 | Hayes et al. | 379/59 |
| 5,533,027 | 7/1996 | Akerberg et al. | 370/347 |
| 5,550,897 | 8/1996 | Seiderman | 379/59 |

FOREIGN PATENT DOCUMENTS

| | | |
|---|---|---|
| 589 619 A2 | 9/1993 | European Pat. Off. . |
| 42 40 249 C1 | 5/1994 | Germany . |
| WO 95/15664 | 6/1995 | WIPO . |
| WO 95/24103 | 9/1995 | WIPO . |
| WO 96/13948 | 5/1996 | WIPO . |

*Primary Examiner*—Curtis Kuntz
*Assistant Examiner*—Binh K. Tieu
*Attorney, Agent, or Firm*—Jenkens & Gilchrist, P.C.

[57] ABSTRACT

A radio-associated telecommunications network (RLL) comprises a radio base station (BS2) and a radio station (MS1) having a control unit (AD1) which serves a first subscriber apparatus (AB1). A public switched telecommunications network (PSTN) having an exchange (VX2) serves a second subscriber apparatus (AB2), this network being connected to the radio base station (BS2). As the telephone receiver of the first subscriber apparatus (AB1) is lifted, an off-hook signal (HS) is sent to the control unit (AD1). This unit delivers to the radio station (MS1) a transmission signal (S2) and an address (B2), which points to the exchange (VX2). A signalling channel (ACC) to the radio base station (BS2) is set-up and the address (B2) is sent on this channel. The radio base station (BS2) sets-up a traffic channel (TCH1) to the radio station (MS1) and establishes a connection (CON1) to the exchange (VX2) with the aid of the address (B2). The exchange (VX2) sends a dial tone (RT) to the first subscriber apparatus (AB1), over the traffic channel (TCH1). A telephone number (NR2) to the second subscriber apparatus (AB2) is now dialled on the keypad of the subscriber apparatus (AB1) and the second subscriber apparatus (AB2) transmits the telephone number to the exchange (VX2) digit by digit via the traffic channel (TCH1). The exchange establishes a second connection (CON2) to the second subscriber apparatus (AB2), sends a ring signal (RS2) and receives an off-hook signal (HS2). This initiates combining of the connections (CON1, CON2) so that the subscriber apparatus (AB1, AB2) are able to communicate via the traffic channel (TCH1).

10 Claims, 8 Drawing Sheets

METHOD AND ARRANGEMENT FOR ESTABLISHING A CONNECTION IN A TELECOMMUNICATIONS SYSTEM

TECHNICAL FIELD OF THE INVENTION

The invention relates to a telecommunications system in which a connection between two subscribers includes a radio transmission. The invention also relates to how this connection is established.

DESCRIPTION OF RELATED ART

In the construction of a telecommunications system, for instance a telephone network, subscriber stations have traditionally been connected to the exchanges of the system through the medium of telephone wires. A radio telecommunications system, for instance a mobile telephone system, is an alternative to this type of system construction. In radio telecommunications systems, the subscribers are mobile and are connected to the exchanges of the system via a radio connection with one of the base stations of the system. In some cases, it has been found beneficial to combine these two types of systems in the following way. A stationary or essentially stationary subscriber station has a radio transceiver which is connected to a radio base station through the medium of a radio connection which replaces the telephone wire connection. In turn, the base station is connected to the exchanges of the system to enable connections to be established with other subscribers in the system.

When constructing this type of combined telecommunications system, it is often desired to be able to use older types of apparatus. These apparatus are adapted in different ways, to suit a radio transmission system, for instance by digitalization of a transmitted speech signal and adaptation of manually dialled subscriber numbers so as to adapt signalling to the radio channel. Another desire is to be able to locate the essentially stationary subscribers in the radio network in a simple manner, so as to enable a connection requested from the permanent network to be readily established.

The U.S. Pat. Nos. 4,737,975 and 4,658,096 teach examples of such adaptation of telephone apparatus to a mobile telephone system. Dialling is effected through tone dialling or through pulse dialling systems and an adapter converts the dialled numbers to digital data. This data is stored in the adapter and when dialling of the number is complete, the number is transmitted to a base station in the mobile telephone system, in the form of a serial data stream.

U.S. Pat. No. 5,117,450 teaches an adaptation unit for adapting a telephone apparatus to a mobile telephone system. The unit adapts speech signals, ringing signals, dialled telephone numbers, etc., to a format suitable for transmission over a radio channel in the mobile telephone system. A dialled telephone number is stored in the adaptation unit, which also evaluates the number and indicates when dialling is complete. When such is the case, the entire number is transmitted immediately over the radio channel.

The U.S. Pat. No. 5,327,480 teaches a telecommunications system in which a mobile subscriber can be paged by a fixed subscriber with the aid of a paging system, whereafter a call can be established between the subscribers. This establishing can be effected in different ways. One method, referred to as "Call Forward" in the patent, involves establishing the connection in a direction from the fixed subscriber to the mobile subscriber. Another method, designated "Meet-Me", involves establishing a first part of the connection from the fixed subscriber to a node in the telecommunications network, and establishing a second part of the connection from the mobile subscriber to the node where the connections are connected together. The mobile apparatus is equipped to manage both types of call connection.

Swedish Patent No. SE 9200467-0 also describes a telecommunications system in which a fixed subscriber calls a mobile subscriber. A first connection is established to a node in the network and the mobile subscriber is paged via a separate paging system. When this subscriber has accepted to answer the call, a second connection is established from the mobile subscriber to the node, whereafter the connections are mutually coupled in the node.

U.S. Pat. No. 4,959,851 describes an adaptation unit for a stationary standard telephone, which enables the telephone to be used in a mobile radio telecommunications system. This system offers its mobile subscribers a number of functions which can be utilized from the standard telephone with the aid of the adaptation unit. When a telephone number is dialled on the standard telephone, for instance by tone dialling, the number is stored in the adaptation unit. This unit indicates when dialling of the number is complete and sends the entire number over a radio channel.

The drawback with known adaptation units that enable a conventional telephone apparatus to be used in a mobile radio telecommunications system is that they are relatively complicated.

SUMMARY OF THE INVENTION

The problem dealt with by the present invention is the establishing in a telecommunications network of a connection between a subscriber connected to the network via radio and a subscriber which is connected via a wirebound part of the network. The radio-associated subscriber has at his/her disposal a subscriber apparatus of the kind used in the wirebound telecommunications network and normally equipped with a keypad for key sending.

The problem is solved essentially by two procedures. One procedure is that the establishment of a traffic channel over the radio connection is initiated by a hook signal delivered by the radio-connected subscriber apparatus. The other procedure is that the establishment of a part-connection from the radio-connected subscriber to an exchange in the telecommunications network and the establishment of a further part-connection from the exchange to the fixed subscriber. The number to this subscriber is transmitted to the exchange on the established traffic channel. The two part-connections are connected together in the common exchange. The problem solution includes devices necessary for carrying out the two procedures.

More specifically, the problem is solved in the following manner. When the radio-connected subscriber desires to reach a subscriber via the wirebound network, a hook signal is generated, for instance by lifting the telephone receiver. This hook signal initiates the subscriber radio unit, so as to establish a radio signalling channel to a radio base station connected to the wirebound network. An address stored at the radio-connected subscriber and defining the aforesaid exchange is transmitted via this signalling channel. A connection is established from the radio base station of the fixed network to said exchange and a traffic channel is established between the radio base station of the network and the radio unit of the radio-connected subscriber and the signalling channel is released. The radio-connected subscriber now dials a subscriber number to the called subscriber, digit by digit. The digits are transmitted successively on the established traffic channel and further on the part-connection to the exchange. When a number analysis effected in the exchange indicates that the subscriber number is complete, this is indicated in the exchange and the part-connection in the wirebound network from the exchange to the called subscriber is established with the aid of the subscriber number. The called subscriber then obtains a ringing signal and generates a hook signal by lifting the telephone receiver, for instance. The hook signal passes to the exchange, which mutually connects the two part-connections, so as to connect the two subscribers one with the other.

The wirebound system may include several radio base stations to which a traffic channel of the radio-connected subscriber can be connected. This enhances the possibility of a subscriber obtaining a free traffic channel in high traffic conditions. The possibility of a subscriber being able to obtain a connection via another base station in the event of a malfunction or error in one base station is also enhanced.

One intention of the invention is to enable connections to be established between the subscribers of a telecommunications system via radio traffic channels in a simple manner. The connection procedure used for subscriber apparatus that are connected via radio is partially the same as that used for connecting wire-bound subscriber apparatus.

Another intention is to enable the subscribers to use conventional subscriber apparatus equipped, for instance, with a tone dialling keypad.

Still another intention is to enable number length analysis to be performed in the fixed network instead of in an adaptation unit connected to the subscriber apparatus.

Yet another intention of the invention is to ensure with a high degree of certainty that the radio-connected subscriber will obtain a traffic channel over the radio connection.

One advantage afforded by the invention is that subscriber apparatus equipped with a tone dialling facility for instance, only require the inclusion of relatively simple means to enable them to be used in the radio-associated system.

Another advantage is that the actual radio receiver of the radio-connected subscriber may have a relatively simple design.

Still another advantage is that the radio base stations may also be given a relatively simple design.

Yet another advantage is that the often heavily loaded signalling channels can be quickly released, because the subscriber number is transmitted on a traffic channel.

BRIEF DESCRIPTION OF THE DRAWINGS

The invention will now be described in more detail with reference to exemplifying embodiments thereof and also with reference to the accompany drawings, in which.

DETAILED DESCRIPTION OF EMBODIMENTS

Figure 1:
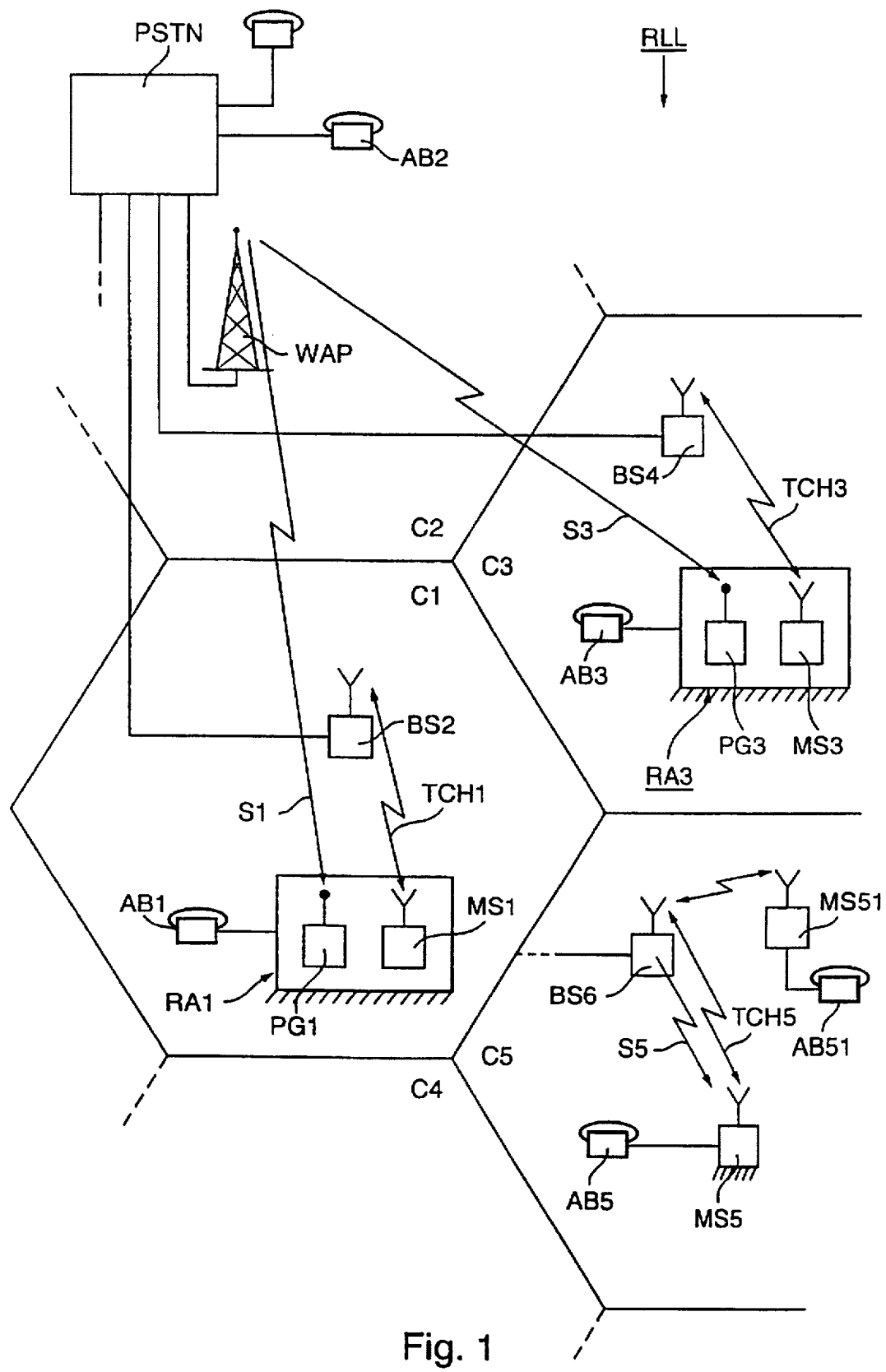
FIG. 1 illustrates a view of a telecommunications network.

FIG. 1 is an overview of a telecommunications network which includes a public switched telecommunications network PSTN and a radio-associated telecommunications network RLL. A connection can be established in the telecommunications system between a first subscriber apparatus AB1 in the telecommunications network RLL and a second subscriber apparatus AB2 in the public network. The first subscriber apparatus AB1 is radio-connected, but is essentially stationary and the wire connection between the subscriber and its local exchange found in traditional public switched telecommunications networks is replaced by a radio connection.

The telecommunications network RLL is divided into areas, cells, each of which denotes an area covered by a radio base station. The Figure shows cells C1–C5, and the telecommunications system RLL is connected to the public switched telecommunications network PSTN. An essentially stationary first radio unit RA1 is located in the cell C1 and corresponding radio units are located in other cells, for instance the radio unit RA3 in cell C3 and the radio station MS5 in cell C5. Also located in the cell C1 is a radio base station BS2, and corresponding base stations are located in other cells, for instance the radio base station BS4 in cell C3 and the radio base station BS6 in cell C5. A radio station WAP included in a radio paging system, a so-called Wide Area Paging System, is connected to the public switched telecommunications network PSTN and transmits paging signals S1. The first radio unit RA1 includes a radio station MS1 to which the radio base station BS2 can establish a traffic channel TCH1, and a paging signal receiver PG1. The first subscriber apparatus AB1 is connected to this radio unit.

The essentially stationary radio unit RA3 in the cell C3 includes a radio station MS3 and a paging signal receiver PG3 and is connected to a subscriber apparatus AB3. A traffic channel TCH3 for the subscriber apparatus AB3 can be established between the radio base station BS4 and the radio station MS3, and the subscriber apparatus AB3 may be paged through a paging signal S3 from the station WAP.

The essentially stationary radio station MS5 is connected to a subscriber apparatus AB5 and a traffic channel TCH5 can be established between the radio base station BS6 and the radio station MS5. The radio station MS5 lacks separate receivers for paging signals from the radio transmitter WAP and when the subscriber apparatus AB5 is paged, a paging signal S5 is sent from the radio base station BS6 directly to the radio station MS5. A radio base station can serve several subscribers, as shown with a subscriber apparatus AB51 connected to a radio station MS51. The radio base station BS6 is connected to the telecommunications network PSTN, as indicated with broken lines in the Figure.

The establishment of a connection between the first subscriber apparatus AB1 and the second subscriber apparatus AB2 will be described in more detail with reference to FIG. 2. Among other things, this Figure includes a block schematic illustrating the radio unit RA1 and an exchange in the telecommunications network PSTN, and certain signals that are transmitted in the telecommunications system.

Figure 2:
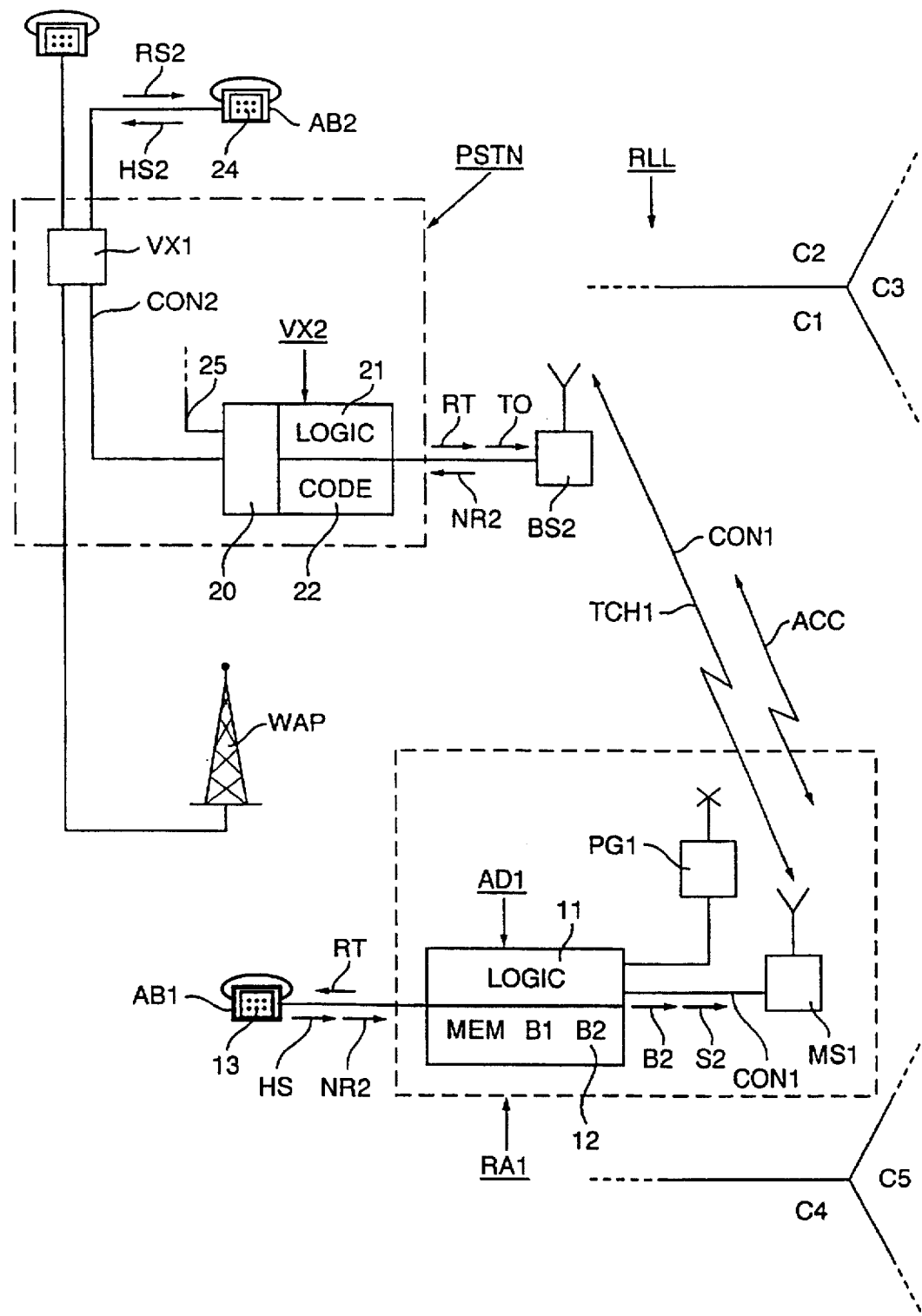
FIG. 2 is a block schematic illustrating a part of the telecommunications network in which a radio-connected subscriber makes a call.

FIG. 2 illustrates the public switched telecommunications network PSTN and the radio-associated telecommunications network RLL which is divided into cells, with the cells C1–C5 being shown in the Figure. The first radio unit RA1 includes a control unit AD1 which is connected to the first subscriber apparatus AB1, to the radio station MS1 and to the paging signal receiver PG1. The control unit AD1 includes a logic unit 11 and a memory 12. In the case of the illustrated embodiment, the first subscriber apparatus AB1 is a telephone with a keypad 13 for manual dialling. The second subscriber apparatus AB2 is connected to a first exchange VX1 in the telecommunications network PSTN which in the case of this embodiment also has a second exchange VX2 which is connected to the first exchange. The exchange VX2 is connected to the base station BS2 in the telecommunications network RLL and includes a coupling unit 20, a logic unit 21 and a code transmitter/receiver 22. The radio station WAP is connected to the telecommunications network PSTN and, in the illustrated case, to its exchange VX1. The second exchange VX2 is connected to further exchanges in the telecommunications network PSTN, as indicated with a connection 25. Broadly speaking, a connection from the first subscriber apparatus AB1 to the second subscriber apparatus AB2 is effected by establishing a first connection CON1 between the subscriber AB1 and the second exchange VX2, and establishing a second connection CON2 between the second exchange VX2 and the subscriber AB2, whereafter the exchange VX2 interconnects the two connections.

The establishment of a connection from the subscriber AB1 to the subscriber AB2 will be described below with reference to FIG. 2. As the telephone receiver is lifted from the subscriber apparatus AB1, the apparatus delivers a hook signal HS from its hook switch function, this signal being detected by the logic unit 11. The logic unit also detects that there is no signal from the receiver PG1, which denotes that it is a call request originating from the subscriber apparatus AB1. The logic unit collects an address B2 from the memory 12, due to the hook signal. This address points out the second exchange VX2. The logic unit adds a transmission order S2 to. the address B2 and delivers these two signals to the radio station MS1. A signalling channel ACC is set up between the radio base station BS2 and the radio station MS1 in response to the transmission order S2, and the radio station sends the address B2 to the radio base station BS2 on the signalling channel ACC. The first connection CON1 is now set up between the telephone apparatus AB1 and the exchange VX2, by virtue of the following two procedures. A first procedure involves establishing a fixed connection between the radio base station BS2 and the second exchange VX2 with the aid of the address B2. This address shall thus be considered as a command to establish the connection between the radio base station BS2 and the exchange VX2. The authenticity of the subscriber apparatus AB1 is also checked in conjunction herewith, i.e. that the apparatus may be connected to the telecommunications network PSTN via the radio base station BS2. The second procedure is that the base station BS2 establishes the traffic channel TCH1 to the radio station MS1 with the aid of the signalling channel ACC, whereafter the signalling channel ACC is released. The connection CON1 is herewith complete and the code-transmitter/receiver 22 in the exchange VX2 sends a dial tone RT to the base station BS2, which transmits the dial tone to the radio station MS1 on the established traffic channel TCH1. The dial tone RT is forwarded to the telephone apparatus AB1 and produces an acoustic signal which indicates to the subscriber that dialling can commence. The subscriber manually dials a telephone number NR2 of the subscriber apparatus AB2 and this number is transmitted to the exchange VX2 on the connection CON1. The number NR2 is transmitted via the traffic channel TCH1, digit for digit, at the rate at which the subscriber operates the keypad 13. The subscriber apparatus AB1 is a tone dialling telephone and the digits are transmitted by so-called DTMF signalling (Dual Tone Multiple Frequency). The exchange VX2 switches the connection in the telecommunications network PSTN, in accordance with the received digits in the number NR2. In the case of the illustrated embodiment, the connection is also switched to the first exchange VX1, which receives digits in the number NR2. The exchange VX1 then switches the connection to the second subscriber apparatus AB2 and delivers a ring signal RS2 to the subscriber apparatus AB2. The subscriber on the subscriber apparatus AB2 receives the call from the subscriber apparatus AB1, by lifting the receiver, and the second connection CON2 is therewith complete. The subscriber apparatus AB2 delivers a hook signal HS2 and the two connections CON1 and CON2 are joined together in the coupling unit 20, with the aid of this signal. If the number NR2 is not dialled completely, the connection CON1 is released after a time out period, through a signal TO (Time Out) from the exchange VX2 to the base station BS2.

It should be noted that the connection CON2 is established in a completely conventional manner. In the case of the illustrated embodiment, the connection is established via the exchange VX1, although it will be understood that the connection can be coupled directly from the second exchange VX2 to a subscriber, or coupled to a subscriber via a plurality of exchanges in the telecommunications network PSTN. These additional connection routes are also effected in accordance with well-known techniques and are not shown in FIG. 2. The called subscriber may be located, for instance, in a mobile telephone system connected to the public switched telecommunications network PSTN. Connection of the call from the exchange to the subscriber is also in this case effected in accordance with well-known techniques and is not shown in FIG. 2.

The radio station MS1 and the radio base station BS2 include circuits for modulating transmitted signals and setting-up carrier frequencies and, when applicable, time slots in accordance with a chosen standard. These circuits form no part of the present invention and will therefore not be described in the present embodiment.

Figure 3:
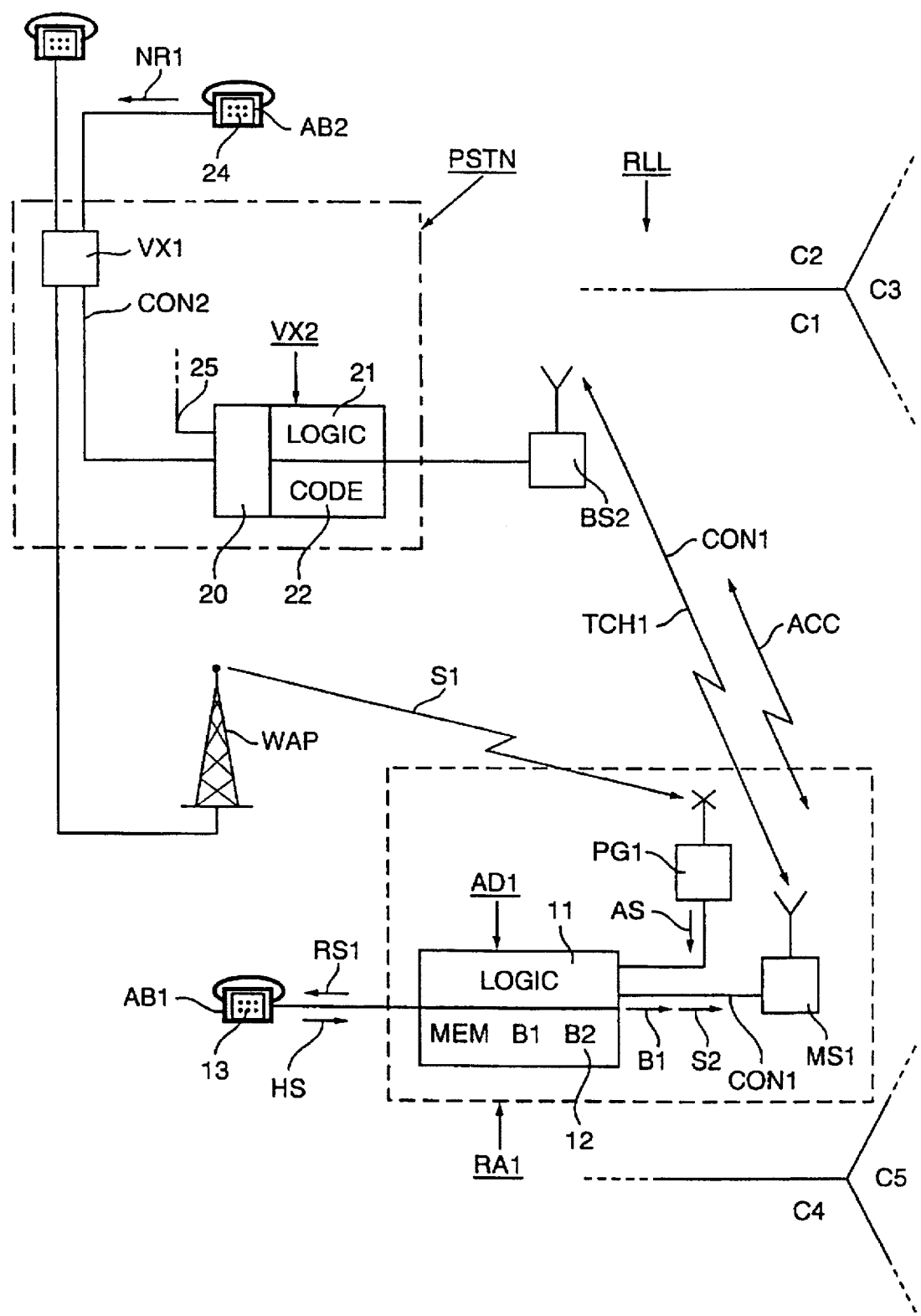
FIG. 3 shows the block schematic of FIG. 2 with a call request from the network to the radio-connected subscriber.

For the sake of completeness, the manner in which a call is set up from the second subscriber apparatus AB2 to the first subscriber apparatus AB1 will be outlined with reference to FIG. 3. In this case, it is assumed that the subscriber apparatus AB2 is a telephone apparatus having a keypad 24 for tone dialling. As a subscriber lifts the receiver of the telephone apparatus AB2, a hook signal is sent to the network PSTN which then sends a dial tone to the apparatus. The subscriber dials on the keypad 24 a telephone number NR1 which points out the first subscriber apparatus AB1. A connection, which is the aforesaid second connection CON2, is established to the second exchange VX2, via the first exchange VX1. The exchange VX1 sends a signal to the station WAP, which sends the paging signal S1 to the receiver PG1. The receiver PG1 receives the signal S1 and delivers a corresponding alert signal AS to the logic unit 11, which converts the signal to a ring signal RS1. The subscriber lifts the receiver and the apparatus AB1 delivers the hook signal HS to the logic unit 11. This unit combines the hook signal HS with the alert signal AS, collects in response to this an address B1 in the memory 12, adds the transmission signal S2 and delivers the signals to the radio station MS1. The signalling channel ACC to the base station BS2 is established, the address B1 is transmitted on the channel ACC, and a connection to the second exchange VX2 is established with the aid of the address B1. The traffic channel TCH1 is established between the radio station MS1 and the base station BS2 so that the first connection CON1 to the exchange VX2 becomes complete. The exchange VX2 interconnects the connections CON1 and CON2.

Figure 7:
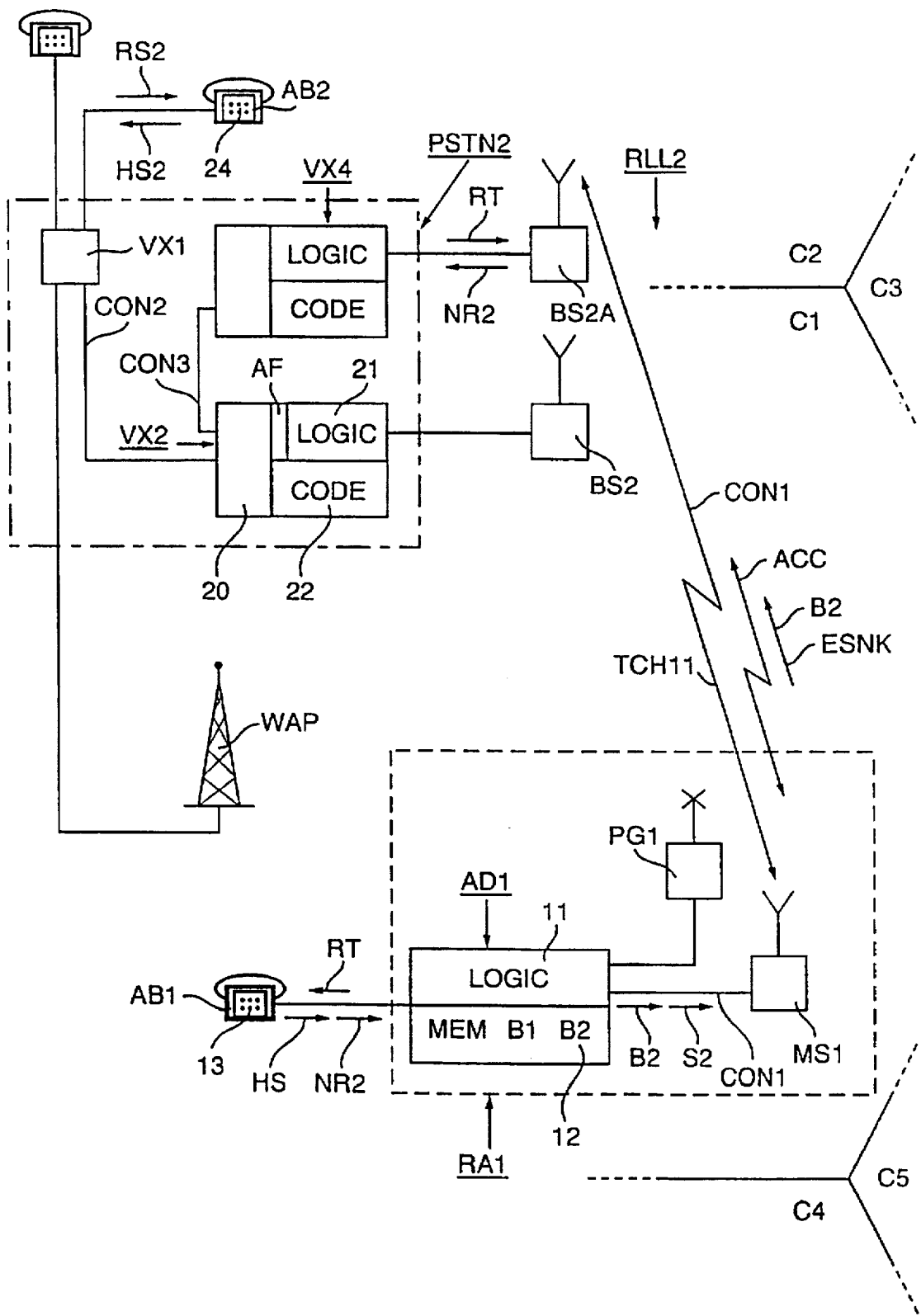
FIG. 7 is a block schematic illustrating part of another alternative telecommunications network.

Certain details of the aforedescribed telecommunications system and the establishment of a connection will be described in more detail with reference to FIGS. 4, 5 and 7.

Figure 4:
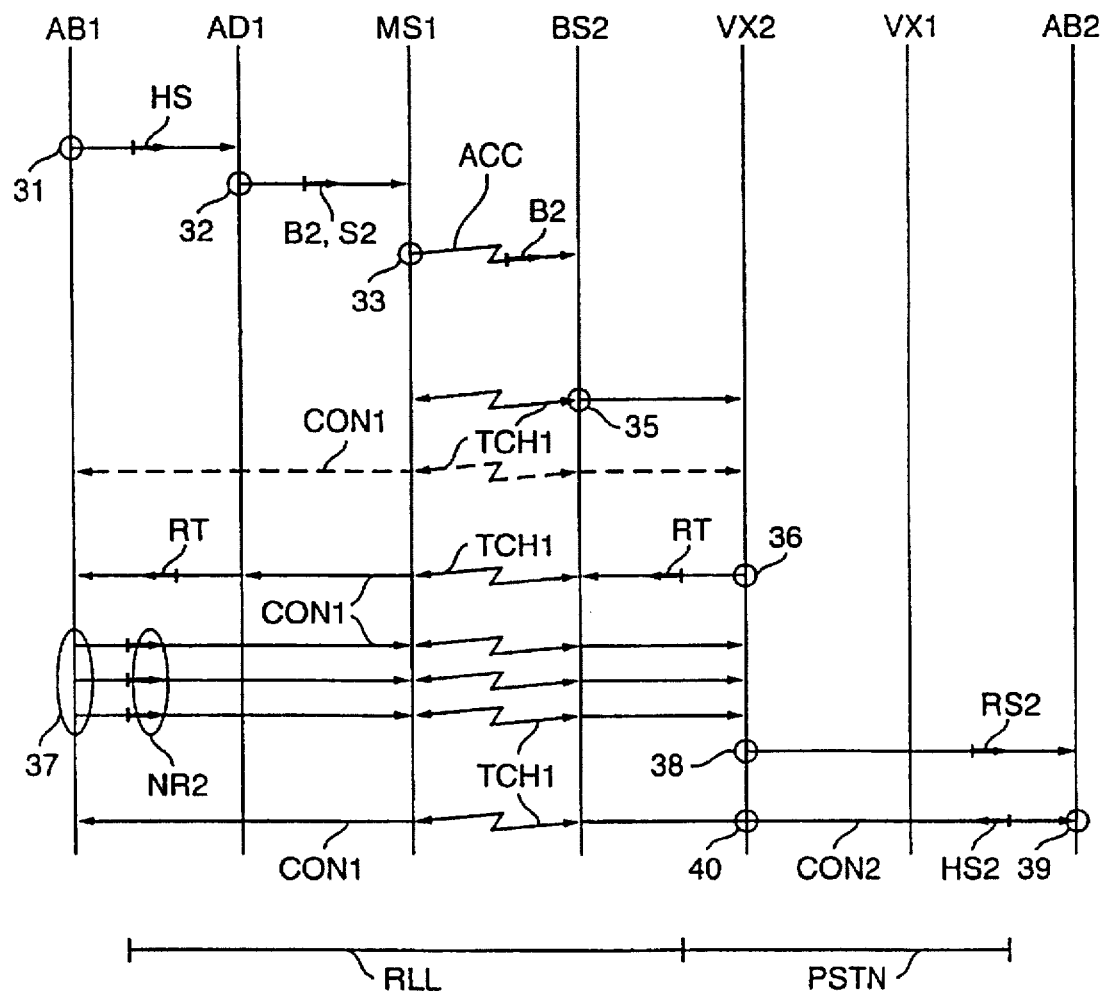
FIG. 4 is a signalling diagram illustrating the establishment of a connection in response to a call from the radio-connected subscriber.
Figure 5:
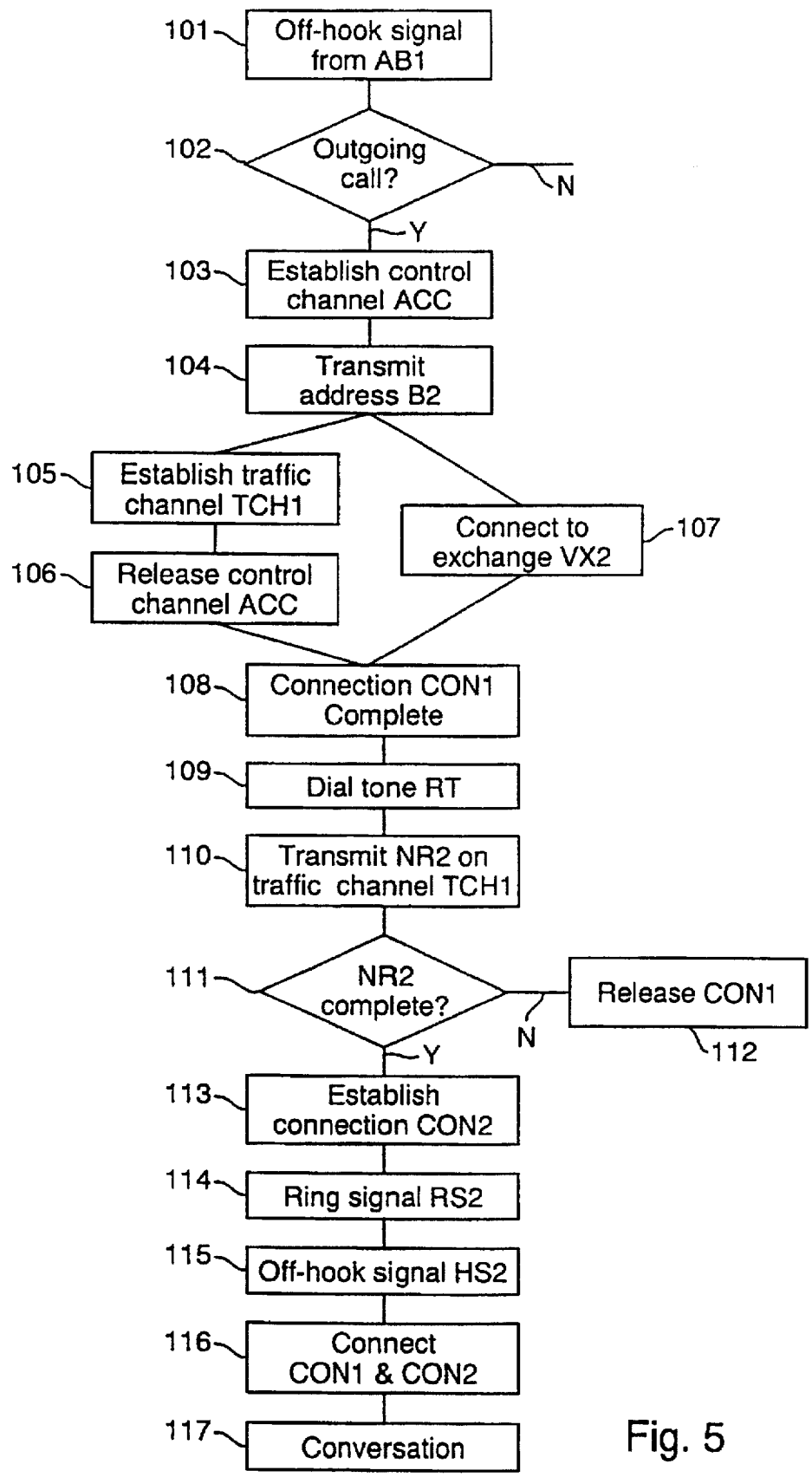
FIG. 5 is a flowsheet illustrating the establishment of the connection.

FIG. 4 is a signalling diagram which illustrates how the connection CON1 and the connection CON2 are established when a connection is requested by the essentially stationary, radio-associated apparatus AB1. The various parts AB1, AD1, MS1, BS2, VX2, VX1 and AB2 of the telecommunications system are noted uppermost in the Figure and are marked with vertical lines. The connections between said parts are marked with arrows, certain events are marked with rings, and signals are noted with their respective arrows. In the case of this embodiment, the base station BS2 and the radio station MS1 are assumed to work in accordance with the American mobile telephone standard EIA/TIA IS-54. A marking 31 denotes the subscriber lifting the telephone receiver on the apparatus AB1, which results in transmission of the hook signal HS to the control unit AD1. The control unit delivers the address B2 and the transmission command S2 to the radio station MS1, in accordance with marking 32, and the radio station requests access to the base station BS2 and obtains the signalling channel, ACC, in accordance with marking 33. In accordance with marking 34, the radio station MS1 locks to this channel and sends the address B2 to the base station BS2. The base station BS2 establishes the traffic channel TCH1 with the aid of the signalling channel ACC, in accordance with marking 35, and establishes the connection to the second exchange VX2. The first connection CON1 is therewith complete, as marked with a broken line in the Figure. In accordance with marking 36, the exchange VX2 delivers the dial tone RT, which is sent to the subscriber apparatus AB1 on the connection CON1. In accordance with marking 37, the subscriber hears the dial tone and dials the telephone number NR2 of the subscriber apparatus AB2, digit by digit. The digits are transmitted successively on the connection CON1, via the traffic channel TCH1, which is marked in the Figure with three repeated lines for the connection CON1. When dialling of the number NR2 has been completed, the exchange VX2 establishes the second connection CON2 to the subscriber apparatus AB2 via the first exchange VX1, in accordance with marking 38. The first exchange VX1 delivers the ring signal RS2 to the subscriber AB2, who lifts the telephone receiver so as to deliver the hook signal HS2, in accordance with marking 39. The second exchange VX2 interconnects the connections CON1 and CON2 and connects the subscriber to the second subscriber apparatus AB2 in accordance with marking 40, this second subscriber being able to answer the call via the connection CON1 and CON2. Those parts of the connections which are embraced by the telecommunications network RLL and the public switched telecommunications network PSTN are indicated in the Figure with a horizontal line.

In the above description made with reference to FIGS. 1–4, signals, for instance the address B2, are transmitted over the radio channels between the radio station MS1 and the base station BS2. A speech signal is also transmitted on the traffic channel TCH1. The transmission includes signal processing carried out in the base station BS2 and the radio station MS1 respectively. This signal processing is effected in accordance with a chosen standard, in the case of the present description in accordance with the aforesaid mobile telephone standard EIA/TIA IS-54, and does not form part of the invention. In the case of the present embodiment, the second subscriber apparatus AB2 is connected directly to the public switched telecommunications network PSTN. According to an alternative, obvious to the skilled person, the second subscriber apparatus is connected in, e.g., a mobile telephone network, which in turn is connected to the public switched telecommunications network PSTN. As an alternative the establishing of the traffic channel TCH1 can be performed in accordance with the European mobile telecommunications system GSM. In this system the radio station MS1 first requests an access channel. With the aid of this channel a signalling channel is established between the base station BS2 and the radio station MS1. By signalling on the signalling channel the traffic channel TCH1 is established.

An overview of the inventive method will now be described with reference to the flowsheet presented in FIG. 5. The subscriber lifts the telephone receiver of the apparatus AB1, which delivers the hook signal HS in accordance with block 101. It is ascertained in block 102 whether or not the call is an outgoing call from the apparatus AB1. If such is not the case, i.e. the alert signal AS exists, there is followed a procedure in accordance with alternative N, which is not included in the present invention. If the alert signal AS does not exist, the call is an outgoing call from the apparatus AB1 in accordance with an alternative Y. In this latter alternative, the signalling channel ACC is established between the radio station MS1 and the radio base station BS2, in accordance with block 103, and the address B2 is sent to the base station BS2 on the channel ACC, in accordance with block 104. In accordance with block 105, the traffic channel TCH1 is established between the base station BS2 and the radio station MS1, and the channel ACC is released in accordance with block 106. The connection between the base station BS2 and the second exchange VX2 is established with the aid of the address B2, in accordance with block 107 and the traffic channel TCH1 is interconnected with the connection to the exchange VX2 in accordance with block 108, so that the first connection CON1 becomes complete. The subscriber apparatus AB1 receives the dial tone RT from the code transmitter/receiver 22 in the exchange VX2 in accordance with block 109, and the subscriber begins to dial the telephone number NR2. In accordance with block 110, the digits in this number are transmitted successively on the traffic channel TCH1 to the second exchange VX2 as the digits are keyed-in. The exchange VX2 detects whether or not the whole of number NR2 has been dialled within the predetermined time interval in accordance with block 111. If such is not the case, the first connection CON1 is released in pursuance of alternative N and in accordance with block 112. If the number NR2 has been dialled completely, the second connection CON2 is established pursuant to alternative Y and in accordance with block 113. The ring signal RS2 is delivered to the subscriber apparatus AB2, in accordance with block 114. The subscriber lifts the telephone receiver of apparatus AB2, wherewith the hook signal HS2 is delivered in accordance with block 115. The connections CON1 and CON2 are connected together in accordance with block 116, and it is possible to carry on a conversation via the subscriber apparatus AB1 and AB2 in accordance with block 117.

It is mentioned in the aforegoing that the radio station MS1 is essentially stationary, and this has also been shown in the Figures. By "essentially stationary", it is meant that the radio station with the control unit AD1 and the subscriber apparatus AB1 are limitedly movable within a building for instance, but that the radio station is stationary when making a call. For instance, the subscriber apparatus AB1 may be a conventional desk telephone handset which is used only when stationary. The fact that the radio station MS1 is essentially stationary can be utilized by enabling its circuits to be made relatively simple in comparison with a typical mobile telephone. It is not necessary for the radio station to compensate for problems concerned with radio wave propagation, for instance fading, to the same extent as the standard mobile telephone. Problems concerned with switching between different radio base stations, handover, can be avoided in those instances when the radio station MS1 can be connected only to one radio base station.

Figure 6:
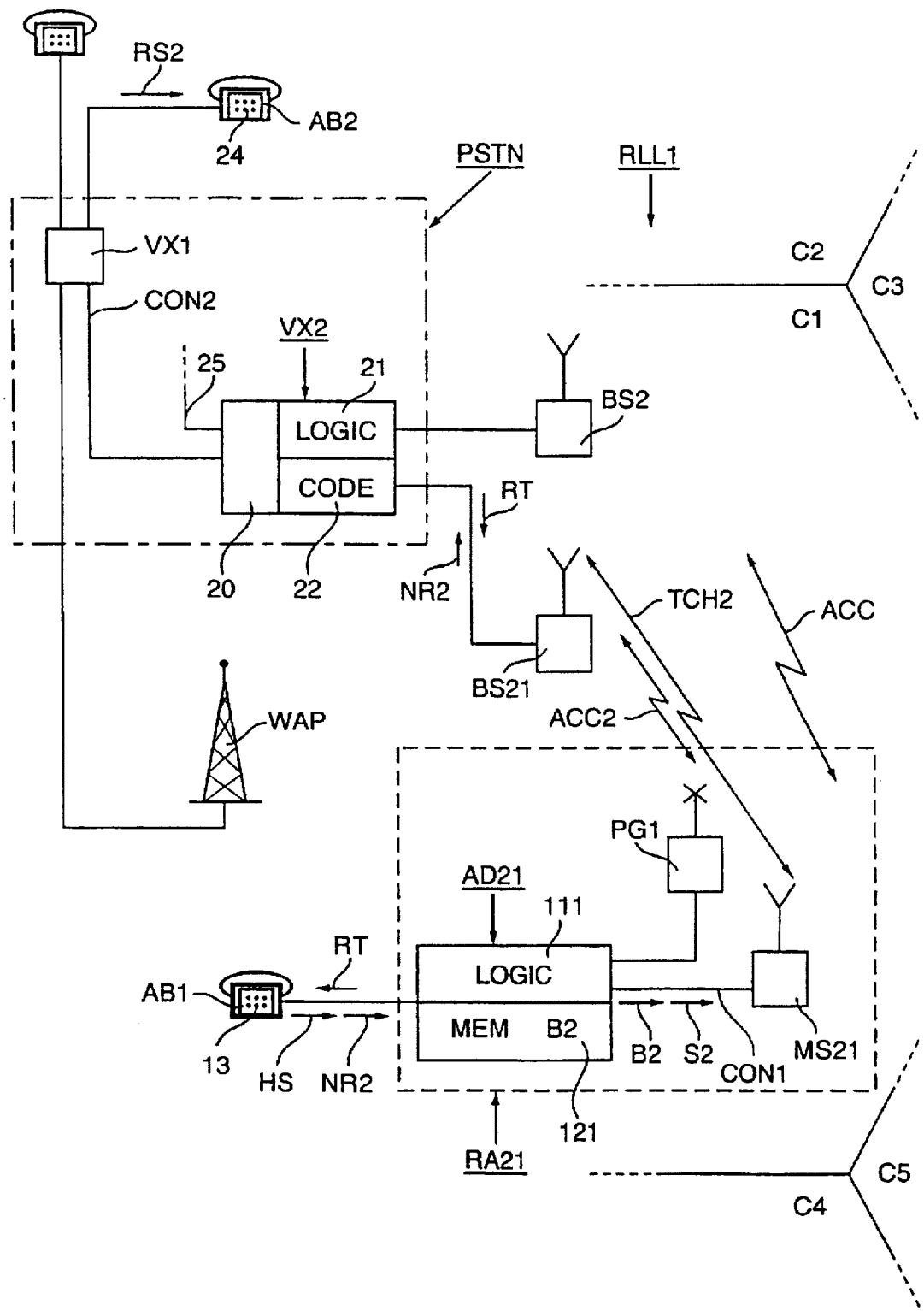
FIG. 6 is a block schematic illustrating part of an alternative telecommunications network.

An alternative embodiment of the invention will be described in brief with reference to FIG. 6. The Figure shows the public switched telecommunications network PSTN and a radio-associated telecommunications network RLL1. This network includes the radio base station BS2 and a further radio base station BS21 in the cell C1. These two radio base stations can be connected to a radio unit RA21 including a radio station MS21 which is connected to the first subscriber apparatus AB1 via a control unit AD21. The control unit has a logic unit 111 and a memory 121, in which the address B2 is stored, similar to the FIG. 2 embodiment.

As the telephone receiver of the subscriber apparatus AB1 is lifted from its hook, the hook signal HS is sent to the control unit AD21. The logic unit 111 receives the hook signal and, as in the case of the earlier embodiment, the logic unit ascertains whether or not the call is an incoming or an outgoing call. In the case of outgoing calls, the logic unit reads the address B2 from the memory 121, adds the transmission order S2 and delivers the signals to the radio station MS21. Guided by the address B2, the radio station asks the base station BS2 for a traffic channel via the signalling channel ACC. If this base station has unoccupied traffic channels, the connection is allocated the traffic channel TCH1, similar to the case in the earlier embodiment. However, it may be that all traffic channels are occupied, in which case the base station BS2 rejects the request from the radio station MS21. The radio station MS21 detects that the request has failed, for instance by receiving a "Directed Retry Order" from the base station BS2 with a message to try to obtain access to base station BS21. The radio station MS21 sends to the base station BS21 a request for a signalling channel ACC2. If the request is successful, the base station BS21 allocates a traffic channel TCH2. The two part-connections CON1 and CON2 are then connected to the subscriber apparatus AB2 in the manner described in the earlier embodiment with reference to FIG. 2. Thus, this includes transmitting the register tone R2 and the telephone number NR2 on the traffic channel TCH2. The telecommunications network RLL1 with the two base stations BS2 and BS21 in the cell C1 has the advantage that the subscriber apparatus AB1 is able to establish a connection via the public switched telecommunications network PSTN with additional certainty.

Another alternative embodiment of the invention will now be described with reference to FIG. 7. This Figure illustrates a public switched telecommunications network PSTN2, to which the subscriber apparatus AB2 is connected, and a radio-associated telecommunications network RLL2 to which the subscriber apparatus AB1 is connected. The telecommunications network PSTN2 includes the first exchange VX1 and the second exchange VX2, as in the earlier case, and also a further exchange VX4. This exchange is connected to the second exchange VX2 and may also be connected to further exchanges in the telecommunications network PSTN. The exchange VX4 is constructed in the same way as the exchange VX2 and includes a coupling unit, a logic unit and a codetransmitter/receiver. These exchanges have in their respective logic units an authentication unit AF, which in the case of the present embodiment is shown in respect of exchange VX2. The second exchange VX2 is connected to the radio base station BS2 as earlier and the exchange VX4 is connected to a radio base station BS2A. The radio-associated telecommunications network RLL2 includes the base stations BS2 and BS2A and the radio unit RA1 to which the first subscriber apparatus AB1 is connected.

The radio station MS1 can obtain a connection to the base station BS2A if it is not possible with the call from the subscriber apparatus AB1 to be allocated the traffic channel TCH1 between the basestation BS2 and the radio station MS1. For instance, the radio base station BS2 may be fully occupied or may suffer a temporary fault. One difficulty that can arise in this situation is related to the check on the authenticity of the calling subscriber apparatus AB1, in other words the check that is carried out to ensure that the subscriber apparatus is authorized to use the public switched telecommunications network PSTN2. It is assumed in the case of this embodiment that the authentication procedure described in the International Patent Application PCT/SE94/01121 is used. The difficulty arises when an identity designation ESN for the subscriber apparatus AB1 is encrypted with a counter and when the exchange VX2 includes a counter which must take part in the check on subscriber authenticity. It is then necessary to connect the call via the second exchange VX2, despite the radio station MS1 having a connection to the radio base station BS2A connected to the exchange VX4. The problem associated with authentication is known to the art and the solutions are also known. However, the authentication example shows that it may be necessary to always connect a call arriving from certain subscribers via a specific node in the telecommunications network.

A connection is established from the subscriber apparatus AB1 to the subscriber apparatus AB2 in the following way. The first part of the connection is effected in the manner described with reference to FIG. 2. The subscriber apparatus delivers the hook signal HS as the telephone receiver is lifted. The control unit AD1 delivers the address B2 and the transmission order S2 to the radio station MS1, which requests for a signalling channel. The signalling channel ACC is established to the base radio station BS2A and the address B2 is transmitted on the signalling channel ACC together with an encrypted terminal identity ESNK. A connection is set-up to the exchange VX4, which receives the address B2. Because the address B2 points out the exchange VX2, a connection CON3 is established to this exchange. The authentication function AF receives the encrypted terminal identity ESNK and checks the authenticity of the subscriber apparatus AB1. If the authentication function shows the subscriber apparatus AB1 has access to the telecommunications network PSTN2, the radio base station BS2A establishes a traffic channel TCH11, wherewith the first connection CON1 is complete. Switching is then effected in the manner described above with reference to FIGS. 2 and 4. The code-transmitter/receiver 22 in the exchange VX2 transmits the dial tone RT to the subscriber apparatus AB1 over the traffic channel TCH11, the subscriber begins to dial the telephone number NR2 which is transmitted to the coupling unit 20 in the exchange VX2, this exchange establishing the second connection CON2 to the second subscriber apparatus AB2 with the aid of the first exchange VX1, which delivers the ring signal RS2. As the subscriber on the subscriber apparatus AB2 lifts the telephone receiver the second hook signal HS2 is delivered, which signal is received by the coupling unit 20 in which the connection CON1 and CON2 are interconnected.

Figure 8:
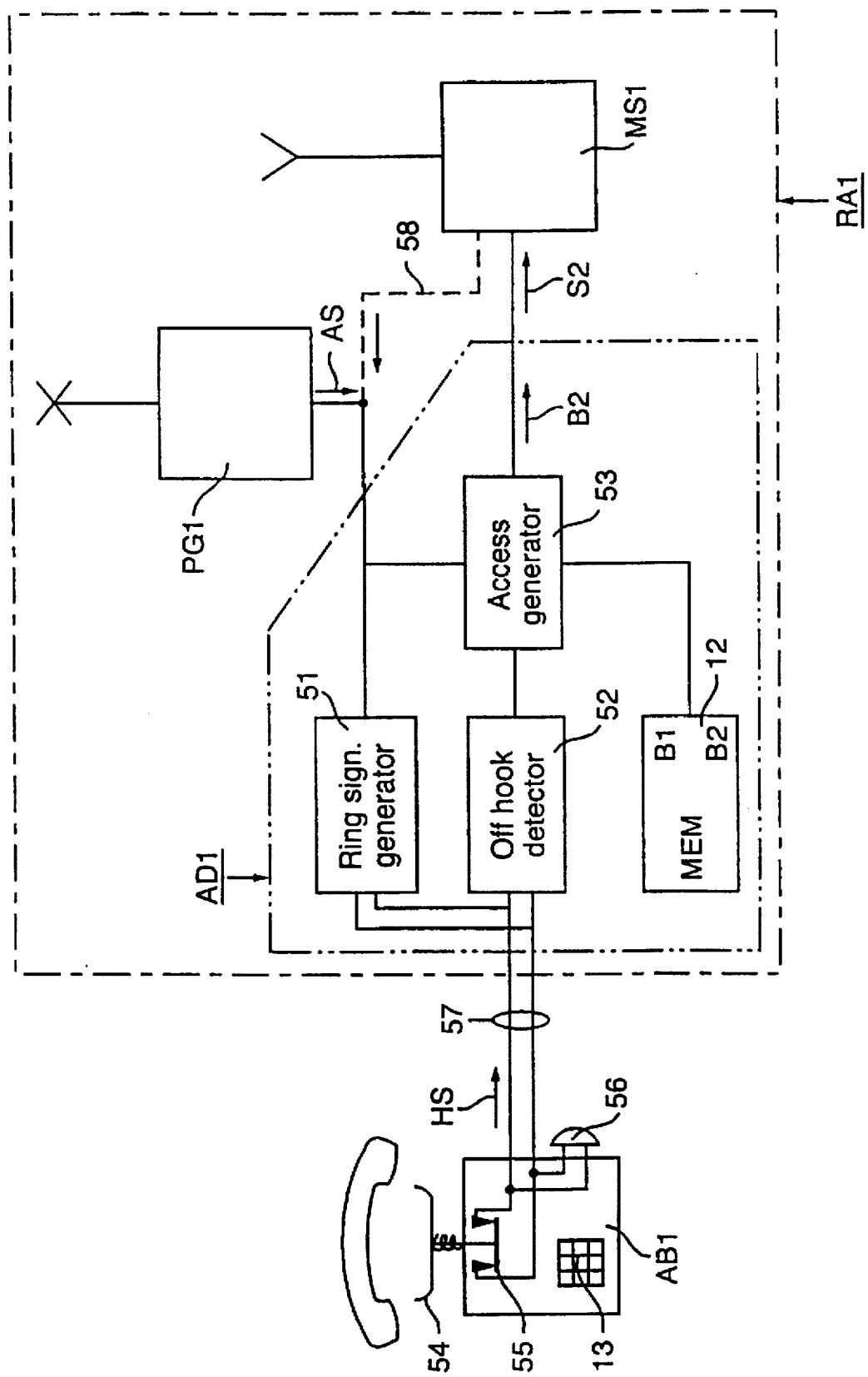
FIG. 8 is a block schematic illustrating details of the block schematic in FIG. 2.

The radio unit RA1 in FIG. 2 is shown in somewhat more detail in FIG. 8. In addition to the memory 12, the control unit AD1 also includes a ring signal generator 51, a hook signal detector 52 and an "access generator" 53. The subscriber apparatus AB1 is shown partly with its hook 54 connected to a hook switch 55, and partly to a bell 56. The hook switch 55 is connected to the hook signal detector 52 via a two-wire connection 57 and the ring signal generator 51 is connected to the bell 56, also via the connection 57. The receiver PG1 is connected to the ring signal generator 51, the broken wire connection 58 illustrating an alternative in which the radio station MS1 is connected to the ring signal generator. The "access generator" 53 has inputs connected to the receiver PG1, to the hook signal detector 52 and to the memory 12, The "access generator" 53 has an output which is connected to the radio station MS1. Speech circuits and tone dialling devices are fully conventional and are not shown in the Figure. Known circuit elements in the subscriber apparatus AB1 have also been omitted.

The off-hook signal detector 52 detects the hook signal HS and delivers a corresponding signal to the "access generator" 53. The latter detects whether or not the alert signal AS has been delivered from the receiver PG1 and if such is not the case the "access generator" reads the address B2 from the memory 12, adds the transmission order S2, and delivers the signals to the radio station MS1.

In the embodiment described with reference to FIGS. 2, 4 and 5, radio signalling is carried out in accordance with the American mobile telephone standard EIA/TIA IS-54. According to this standard, only the signalling channel ACC is used to set-up the traffic channel TCH1. According to other standards, for instance according to the European mobile telephone standard GSM, an access channel is used to set-up a signalling channel which, in turn, is used to set-up a traffic channel on which a call can be made.

We claim:

1. A method of establishing in a telecommunications network (RLL, PSTN) a connection between a first (AB1) and a second (AB2) subscriber apparatus, wherein the telecommunications network includes:
    a radio unit (RA1) which includes an essentially stationary radio station (MS1) and a control unit (AD1) connected thereto, said radio unit (RA1) being connected to the first subscriber apparatus (AB1); and
    at least one radio base station (BS2) connected to a wirebound part (PSTN) of the telecommunications network;
    wherein the establishment of the connection (CON1+CON2) is requested from the first subscriber apparatus (AB1) and the method comprises:
        delivering a hook signal (HS) from the first subscriber apparatus (AB1) to the control unit (AD1);
        signaling on a signaling channel (ACC) between the essentially stationary radio station (MS1) and the radio base station (BS2) in dependence on the hook signal (HS);
        establishing a first connection (CON1) between the first subscriber apparatus (AB1) and the wirebound part (PSTN) of the telecommunications network in dependence on an order transmitted on the signaling channel, including establishing a traffic channel (TCH1) between the essentially stationary radio station (MS1) and the radio base station (BS2);
        transmitting a dial tone (RT) from the wirebound part (PSTN) of the telecommunications network to the first subscriber apparatus (AB1), said transmission being effected via the traffic channel (TCH1);
        transmitting a subscriber number (NR2) from the first subscriber apparatus (AB1) to the wirebound part (PSTN) of the telecommunications network, said subscriber number (NR2) belonging to the second subscriber apparatus (AB2) and being transmitted via the traffic channel (TCH1);
        establishing a second connection (CON2) between the wirebound part (PSTN) of the telecommunications network and the second subscriber apparatus (AB2) in dependence on the subscriber number (NR2); and
        interconnecting the two connections (CON1, CON2) in said wirebound part of the telecommunications network (PSTN).

2. A method according to claim 1, wherein the telecommunications network includes at least two radio base stations (BS2, BS21) which are connected to the wirebound part (PSTN) of the telecommunications network, wherein said method comprises:
    sending from the radio station (MS21) to one of the radio base stations (BS2) a request for a traffic channel (TCH1);
    indicating that the requested traffic channel (TCH1) is not available;
    sending from the radio station (MS21) to an alternative one of the radio base stations (BS21) a request for an alternative traffic channel; and
    allocating said alternative traffic channel (TCH2).

3. A method according to claim 1 or claim 2, wherein the radio base station (BS2) is connected to at least one exchange (VX2, VX4) in the wirebound part (PSTN, PSTN2) of the telecommunications network, and wherein said method further comprises:
    reading an address (B2) from a memory (12) in response to the hook signal (HS), said address (B2) pointing out one of said exchanges (VX2, VX4);
    transmitting the address (B2) through the order transmitted on the signalling channel (ACC); and
    establishing a connection between the radio base station (BS2) and said exchange (VX2) in dependence on the address (B2).

4. A method according to claim 1 or claim 2 wherein the first subscriber apparatus (AB1) is equipped with a keypad (13) for tone dialing purposes, and wherein transmission of the subscriber number (NR2) over the traffic channel (TCH1) is effected digit by digit successively as the digits are keyed in the keypad (13).

5. An arrangement in a telecommunications network (RLL, PSTN) for establishing a connection between a first (AB1) and a second (AB2) subscriber apparatus, said telecommunications network comprising:
    a radio unit (RA1) which is connected to the first subscriber apparatus (AB1);
    at least one radio base station (BS2) connected to a wirebound part (PSTN) of the telecommunications network; and
    an exchange (VX2) in the wirebound part of the telecommunications network (PSTN) having a code transmitter/receiver (22) and a coupling unit (20);
    wherein the arrangement includes:
        an essentially stationary radio station (MS1) having connected thereto a control unit (AD1) in the radio unit (RA1); and a memory (12) in the control unit (AD1) for storing an address (B2) to the aforesaid exchange (VX2); wherein the control unit (AD1) is constructed to order the radio station (MS1) to signal on a signaling channel (ACC) to the radio base station (BS2) and to deliver the address (B2) to the radio station (MS1), in response to an off-hook signal (HS) from the first subscriber apparatus (AB1);

the radio base station (BS2) is constructed to establish a connection to the aforesaid exchange (VX2) in dependence on the address (B2) transmitted on the signaling channel (ACC), and to establish a traffic channel (TCH1) to the radio station (MS1) so as to complete a first connection (CON1) between the first subscriber apparatus (AB1) and the exchange (VX2);

the code-transmitter/receiver (22) is constructed to deliver to the first subscriber apparatus (AB1) a dial tone (RT) over the traffic channel (TCH1);

the first subscriber apparatus (AB1) is constructed to deliver a subscriber number (NR2) belonging to the second subscriber apparatus (AB2) when a number is dialed, said number being transmitted over said first connection (CON1); and the coupling unit (20) in the exchange (VX2) is constructed to establish a second connection (CON2) to the second subscriber apparatus (AB2) in dependence on the subscriber number (NR2), and to connect the first connection (CON1) with the second connection (CON2) in response to an off-hook signal (HS2) from the second subscriber apparatus (AB2).

6. An arrangement according to claim 5, wherein said control unit (AD1) includes a logic unit (11) which is constructed to collect the address (B2) from the memory (12) and to deliver said address (B2) to the radio unit (MS1) together with a transmission order (S2).

7. An arrangement according to claim 5 or claim 6, wherein at least two radio base stations (BS2, BS21; BS2A) are connected to the wirebound part of the telecommunications network (PSTN, PSTN2) and the radio station (MS1) is constructed to request a traffic channel (TCH1) from one of the base stations (BS2) and, in the event of an occupied traffic channel, to request an alternative traffic channel (TCH2) from an alternative radio base station (BS21; BS2A) in response to a transmission order (S2) from said control unit (AD1).

8. An arrangement according to claim 5 or claim 6 wherein said first subscriber apparatus (AB1) is equipped with a tone dialing keypad (13) and the radio unit (RA1) is constructed to transmit the subscriber number (NR2) over the traffic channel (TCH1, TCH2) digit by digit successively, as the digits are keyed on the keypad (13).

9. A method according to claim 3, wherein said first subscriber apparatus (AB1) is equipped with a keypad (13) for tone dialing purposes, and wherein transmission of the subscriber number (NR2) over the traffic channel (TCH1) is effected digit by digit successively as the digits are keyed in the keypad (13).

10. An arrangement according to claim 7, wherein said first subscriber apparatus (AB1) is equipped with a tone dialing keypad (13) and the radio unit (RA1) is constructed to transmit the subscriber number (NR2) over the traffic channel (TCH1, TCH2) digit by digit successively, as the digits are keyed on the keypad (13).

* * * * *